US006702958B2

United States Patent

Takehara et al.

(10) Patent No.: US 6,702,958 B2
(45) Date of Patent: Mar. 9, 2004

(54) ELECTROLUMINESCENT PHOSPHOR AND ELECTROLUMINESCENT ELEMENT THEREWITH

(75) Inventors: Toshifumi Takehara, Fukaya (JP); Mitsuhiro Oikawa, Yokohama (JP); Tsutomu Ishii, Shimada (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 7 days.

(21) Appl. No.: 09/996,609

(22) Filed: Nov. 30, 2001

(65) Prior Publication Data

US 2002/0113226 A1 Aug. 22, 2002

(30) Foreign Application Priority Data

Dec. 7, 2000 (JP) ...................... P2000-372878

(51) Int. Cl.$^7$ .............................................. C09K 11/56
(52) U.S. Cl. .................. 252/301.65; 313/503
(58) Field of Search ...................... 252/301.65; 313/503

(56) References Cited

U.S. PATENT DOCUMENTS 4,275,333 A * 6/1981 Kagami et al. ............. 313/495
5,635,111 A * 6/1997 Kawano et al. ....... 252/301.6 S
5,643,496 A  7/1997 Brese et al. ........... 252/301.65
6,193,908 B1 * 2/2001 Hampden-Smith et al. ...... 252/301.4 R

FOREIGN PATENT DOCUMENTS

JP  2001-31963  2/2001

* cited by examiner

*Primary Examiner*—C. Melissa Koslow
(74) *Attorney, Agent, or Firm*—Foley & Lardner

(57) ABSTRACT

An electroluminescent phosphor includes a phosphor powder that has zinc sulfide as a phosphor host. The phosphor powder has an average particle size, which is expressed by a D(50) value, in the range of 10 μm or more and 20 μm or less. In addition, the phosphor powder has a particle size distribution, in which coarser particle component, of which particle size is 31 μm or more, is 15% by mass or less. An electroluminescent element includes a luminescent layer that includes such electroluminescent phosphor, and of which particle density is heightened on the basis of the average particle size and the particle size distribution of the phosphor powder. A transparent electrode layer is integrally disposed to face one main surface of the luminescent layer, and a rear electrode layer is integrally disposed through a reflective insulating layer on the other main surface. According to such electroluminescent element, brightness may be improved.

18 Claims, 3 Drawing Sheets

ELECTROLUMINESCENT PHOSPHOR AND ELECTROLUMINESCENT ELEMENT THEREWITH

BACKGROUND OF THE INVENTION

1. Field of the Invention

The present invention relates to a high brightness electroluminescent phosphor and an electroluminescent element therewith.

2. Description of the Related Art

An electroluminescent element has a structure in that electrodes are disposed on both surfaces of a luminescent layer, in which an electroluminescent phosphor is dispersed in a dielectrics, and at least one of these electrodes is a transparent electrode. When an alternating voltage is applied between these electrodes, the element is allowed to emit. As the primary usage of the electroluminescent elements, backlight for various kinds of display devices may be cited. Furthermore, the electroluminescent element may constitute a display device by itself.

As the electroluminescent phosphor used for the electroluminescent elements, one of which host is zinc sulfide and which contains copper or manganese as an activator is generally used. A phosphor (ZnS: Cu), in which copper, as the activator, is contained in zinc sulfide, has been used as a blue or blue-green emitting electroluminescent phosphor. Furthermore, a phosphor (ZnS: Cu, Mn), in which copper and manganese, as the activator, are contained in zinc sulfide, has been used as an orange emitting electroluminescent phosphor.

The blue through blue-green emitting electroluminescent phosphor, by making use of its emission color, is applied as the backlight for displays of, for instance, cellular phones. Furthermore, by adding a red dye to the blue or blue-green emitting electroluminescent phosphor, it may be used in a white emitting electroluminescent element. Use of these light-emitting elements (electroluminescent elements) is increasing, as cellular phones and portable information terminals spread. The orange emitting electroluminescent phosphor is applied in display devices for automobile use.

The light emitting element, in which the existing zinc sulfide based electroluminescent phosphor is used, is inferior in brightness characteristics to other light emitting elements. Characteristics required for, for instance, display devices are not necessarily satisfied. From these situations, in order to improve brightness characteristics or the like of the zinc sulfide based electroluminescent phosphors, various kinds of methods have been proposed. For instance, so far, luminous efficiency and life of the zinc sulfide based electroluminescent phosphors have been tried to improve by optimizing amounts of the activator and a coactivator being added. Furthermore, Japanese Patent Application No. 2001-31963 JP-A discloses a method in that high brightness is achieved by annealing zinc sulfide based electroluminescent phosphor at temperatures in the range of substantially 150 to 300° C.

However, according to the existing methods, it is increasingly difficult to sufficiently satisfy the brightness, which is demanded for recent light emitting elements. In general, phosphor raw material is fired under the conditions by which copper or manganese activated zinc sulfide particles grow sufficiently, and thereby the brightness of the electroluminescent phosphor may be heightened. In this case, a particle size of the zinc sulfide based electroluminescent phosphor becomes substantially from 25 to 35 $\mu$m. It is increasingly difficult for the electroluminescent phosphor according to such method to heighten the brightness to a demand level, when configured as an electroluminescent element.

Meanwhile, U.S. Pat. No. 5,643,496 discloses an electroluminescent phosphor made of a copper activated zinc sulfide phosphor, of which average particle size is 23 $\mu$m or less. This small size electroluminescent phosphor is obtained, without implementing an operation such as sieving, by controlling manufacturing conditions (firing conditions and so on) of the electroluminescent phosphor. The aforementioned USP document also discloses that, by making small the electroluminescent phosphor particles, an electroluminescent element therewith may be improved in brightness and life characteristics. However, even in the electroluminescent element, which is constituted of the small size electroluminescent phosphor, which is obtained by controlling such manufacturing conditions only, sufficient brightness is not necessarily obtained. Furthermore, in the small size electroluminescent phosphor, which is manufactured by controlling the manufacturing conditions only, the brightness characteristics may deteriorate in some cases.

BRIEF SUMMARY OF THE INVENTION

Accordingly, an object of the present invention is to provide a zinc sulfide based electroluminescent phosphor, of which brightness characteristics are excellent and do not deteriorate during electroluminescent operation, and which has a particle size and particle size distribution, which are effective in obtaining a brighter electroluminescent element. Another object of the present invention is to provide an electroluminescent element, of which brightness is further improved due to the use of such electroluminescent phosphor.

A high brightness electroluminescent phosphor of the present invention is an electroluminescent phosphor that includes zinc sulfide based phosphor powder, of which average particle size is in the range of 10 $\mu$m or more and 20 $\mu$m or less, in terms of D(50) value (the D(50) value refers to the particle size obtained from the cumulative volume particle distribution curve and corresponds to the size at which the cumulative volume of particles reaches 50%), and particle size distribution includes a particle size component of 31 $\mu$m or more by 15% by mass or less.

In the present electroluminescent phosphor, by removing coarser phosphor particles (coarser particle component) by means of, for instance, classification, the average particle size in terms of the D(50) value, in the range of 10 $\mu$m or more and 20 $\mu$m or less, is obtained, and a ratio of the particle size component of 31 $\mu$m or more is reduced to 15% by mass or less. According to the phosphor powder having such average particle size and particle size distribution, when an electroluminescent element is prepared therewith, the number of phosphor particles a volume in the luminescent layer may be increased. As a result, the brightness of the electroluminescent element may be improved.

The electroluminescent element of the present invention includes the luminescent layer that includes the aforementioned high brightness electroluminescent phosphor of the present invention. As a specific configuration of such electroluminescent element, one that includes a rear electrode layer, which is integrally disposed through a reflective insulating layer along one main surface of the luminescent layer, and a transparent electrode layer, which is integrally disposed along the other main surface of the emitting layer to face thereto, may be cited.

BRIEF DESCRIPTION OF THE DRAWINGS

The invention is described with reference to the drawings, which are presented for the purpose of illustration only and in no way limit the invention.

DETAILED DESCRIPTION OF THE INVENTION

In the following, modes for implementing the present invention will be explained.

Figure 1:
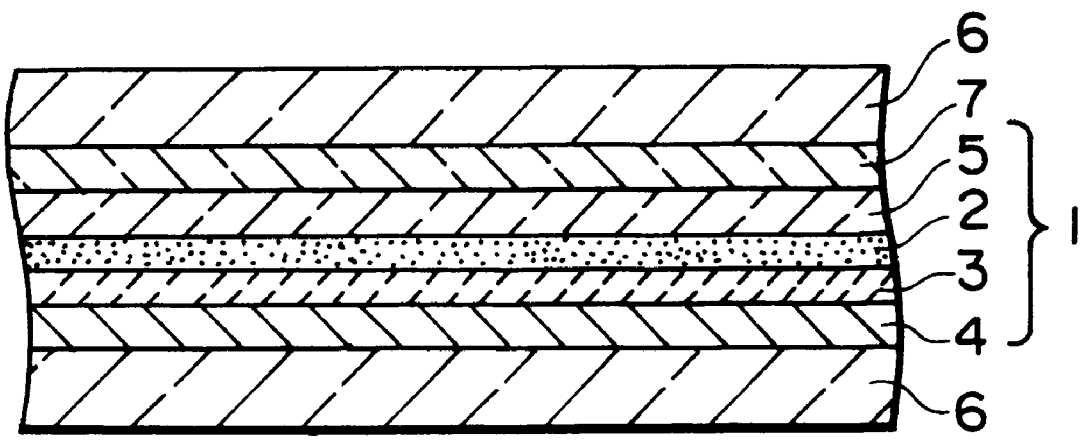
FIG. 1 is a sectional view schematically showing a substantial configuration of an electroluminescent element according to a first mode for implementation of the present invention.

FIG. 1 is a sectional view schematically showing a substantial configuration of an electroluminescent element according to a first mode for implementation of the present invention. The electroluminescent element 1 shown in the figure includes a luminescent layer 2, in which electroluminescent phosphor powder is dispersed in an organic high polymer binder (organic dielectrics) of high dielectric constant, such as, for instance, cyanoethyl cellulose. A thickness of the luminescent layer 2 is in the range of, for instance, from 20 to 50 $\mu$m.

On one main surface of the luminescent layer 2, a reflective insulating layer 3, in which inorganic oxide powder of high reflectivity, such as, for instance, $TiO_2$ or $BaTiO_3$, is dispersed in an organic high polymer binder of high dielectric constant, such as cyanoethyl cellulose, is laminated. A rear electrode layer 4, made of a metal foil, such as an Al foil, or a metal film, is integrally disposed, through the reflective insulating layer 3, along one main surface of the luminescent layer 2.

Furthermore, on the other main surface of the luminescent layer 2, a transparent electrode layer (a transparent electrode sheet) 5, in which an ITO film or the like is deposited on a transparent insulating film, such as a polyester (PET) film, is integrally disposed. The transparent electrode sheet 5 is disposed so that the electrode film (the ITO film) faces the luminescent layer 2.

The transparent electrode layer 5, luminescent layer 2, reflective insulating layer 3, and rear electrode layer 4 are bonded due to, for instance, thermocompression bonding, thereby the electroluminescent element 1 is configured. An electrode is pulled out of each of the rear electrode layer 4 and the transparent electrode layer 5, and, from these electrodes, an alternating voltage is applied to the luminescent layer 2.

The electroluminescent element 1, made of the aforementioned laminate (the body bonded due to thermocompression bonding), is wrapped by a transparent packaging film 6. For the packaging film 6, a moisture-proof film of low moisture permeability, such as, for instance, polychlorotrifluoroethylene (PCTFE) film, may be employed. As needs arise, a moisture absorbing film 7, such as a 6-nylon film, may be disposed on the transparent electrode 5 side. Side drops of the packaging films 6 are bonded, due to thermocompression bonding, to seal the electroluminescent element 1, thereby an electroluminescent panel (an EL panel) 8 is configured.

The aforementioned luminescent layer 2 of the electroluminescent element 1 includes an electroluminescent phosphor, which has a composition in that at least one kind, selected from copper and manganese, is contained in a zinc sulfide host as an activator. The electroluminescent phosphor may contain at least one kind selected from chlorine, bromine, and iodine, which are used as flux. In the electroluminescent phosphor that has zinc sulfide as the host (zinc sulfide based phosphor), a kind of activator selected from copper and manganese controls an emission color.

That is, a zinc sulfide based phosphor, which contains copper as the activator (ZnS :Cu phosphor), may be used as blue through blue green emitting electroluminescent phosphor. At this time, copper is preferably contained in the phosphor host, made of zinc sulfide, in the range of from 0.001 to 0.12% by mass. The contents of chlorine, bromine, iodine, and so on are preferable to be 0.1% by mass or less, furthermore preferable to be in the range of from 0.001 to 0.1% by mass. By incorporating the aforementioned amount of the activator in zinc sulfide, a blue through blue green emitting electroluminescent phosphor, which is excellent in luminous efficiency and emission chromaticity, may be obtained.

A zinc sulfide based phosphor containing copper and manganese as the activator (ZnS: Cu, Mn phosphor) is used as an orange emitting electroluminescent phosphor. At this time, copper and manganese are preferably contained in the phosphor host, made of zinc sulfide, in total, in the range of from 0.001 to 2.0% by mass. The contents of chlorine, bromine, iodine, and so on are preferable to be 0.1% by mass or less, furthermore preferable to be in the range of from 0.001 to 0.1% by mass. By incorporating the aforementioned amount of the activators in zinc sulfide, an orange emitting electroluminescent phosphor, which is excellent in luminous efficiency and emission chromaticity, may be obtained.

The zinc sulfide based phosphor powder, which is used as the electroluminescent phosphor in this mode of implementation, has an average particle size, expressed by D(50), in the range of 10 $\mu$m or more and 20 $\mu$m or less. The zinc sulfide based phosphor further has a particle size distribution, in which a ratio of a particle size component of 31 $\mu$m or more is 15% by mass or less. The electroluminescent phosphor, which has such average particle size and particle size distribution, may be obtained by applying classification to the zinc sulfide based phosphor powder, which is prepared due to an ordinary firing process, and thereby removing coarser phosphor particles (coarser particle component).

According to the aforementioned zinc sulfide based phosphor powder, which has the average particle size (by the D(50) value) in the range of from 10 to 20 $\mu$m, and the particle size distribution of which particle size component of 31 $\mu$m or more is 15% by mass or less, when the luminescent layer 2 is formed by dispersing this phosphor powder in the dielectrics, the number of the phosphor particles in a volume may be increased. In particular, since a distance between the transparent electrode layer 5 and the rear electrode layer 4 (actually, the reflective insulating layer 3), that is, a thickness of the luminescent layer 2, is substantially from 20 to 50 μm, the particle size of the phosphor particle largely influences on the number of the phosphor particles in a volume.

When the average particle size (the D(50) value) of the zinc sulfide based phosphor powder exceeds 20 μm, a particle density of the luminescent layer 2, which uses the above phosphor, becomes lower. As a result, the brightness of the electroluminescent element 1 may not be sufficiently improved. On the other hand, when the average particle size (the D(50) value) of the phosphor powder is less than 10 μm, though the particle density of the luminescent layer 2 increases, the life characteristics deteriorates. As a result, basic characteristics of the electroluminescent element 1 are deteriorated. From the above situations, the average particle size in terms of D(50) value of the phosphor powder is in the range of from 10 to 20 μm. The average particle size of the phosphor powder is more preferable to be in the range of from 11 to 19 μM.

Furthermore, since the phosphor particles of which particle sizes are 31 μm or more (the coarser particle component) become a factor that deteriorates the particle density of the luminescent layer 2, and are low also in their luminous efficiency, they may adversely affect, in particular, on the brightness of the electroluminescent element 1. As a result, in the zinc sulfide based phosphor powder according to the present mode of implementation, a ratio of the coarser particle component, of which particle size is 31 μm or more, is restricted to 15% by mass or less. Thus, by restricting the ratio of the coarser particle component to 15% by mass or less, the particle density of the luminescent layer 2 may be assuredly increased. Thereby, the brightness of the electroluminescent element 1 may be further improved. The ratio of the coarser particle component is preferable to be 10% by mass or less, and more preferable to be 8% by mass or less.

The particle size distribution on a small particle side of the zinc sulfide based phosphor powder is not particularly restricted. However, when the ratio of the smaller particle component is too large, there is a likelihood of adversely affecting on the life of the element. Accordingly, in view of improving the characteristics, such as the life of the element and so on, the zinc sulfide based phosphor powder is preferable to have a particle size distribution in that the smaller particle component, of which particle size is 5.5 μm or less, is 8% by mass or less. The ratio of the smaller particle component is more preferable to be 5% by mass or less. The smaller particle component is preferably contained in the range of from 0.5 to 5% by mass. That is, the zinc sulfide based phosphor powder preferably has a particle size distribution, which contains the coarser particle component, of which particle size is 31 μm or more, by 15% by mass or less, and the smaller particle component, of which particle size is 5.5 μm or less, by 8% by mass or less.

In the present mode of implementation, the particle size distribution of the phosphor powder is measured by means of Micro-track II Particle Size Analyzer (LEEDS & NORTHRUP Instruments), which makes use of optical scattering that occurs when laser light is irradiated to particles. On the basis of the particle size distribution, the average particle size of the phosphor powder in terms of D(50) value, and furthermore the ratio of the coarser particle component, of which particle size is 31 μm or more, and the ratio of the smaller particle component, of which particle size is 5.5 μm or less, are obtained.

On the basis of the aforementioned average particle size and particle size distribution of the zinc sulfide based phosphor powder, the number of the phosphor particles (the particle density) a volume of the luminescent layer 2 may be increased. Thereby, the brightness of the electroluminescent element 1 may be improved with reproducibility. In the existing electroluminescent elements, it is difficult to increase the particle density of the luminescent layer 2, and this is considered to be a larger factor of low brightness of the element.

That is, when the existing electroluminescent phosphor is manufactured under the ordinary firing conditions, in other words, under the firing conditions that are capable of sufficiently growing the phosphor particles, the particle size of the phosphor particles grow larger to result in an average particle size in the range of from 25 to 35 μm. When a luminescent layer is prepared by dispersing such phosphor powder in the dielectrics, the number of the phosphor particles a volume decreases. In such situations, the brightness of the electroluminescent element may not be sufficiently increased.

To these problems, the average particle size of the zinc sulfide based electroluminescent phosphor may be decreased by changing the firing conditions when preparing the zinc sulfide based electroluminescent phosphor, as described below. That is, for instance, lowering a firing temperature, shortening a firing time period, reducing amounts of alkali metal compounds or alkali earth compounds, which are added as the grain growth agent, and so on may reduce the average particle size of the phosphor powder. However, since these do not allow forming a sufficient crystalline structure, the luminous efficiency of the electroluminescent phosphor may decrease. In addition, since the particle size distribution of the phosphor powder becomes broader, the ratio of the coarser particle component may increase.

In the present invention, the zinc sulfide based phosphor powder is prepared by firing under the conditions, which are capable of sufficiently growing particles, and by classifying the phosphor powder to remove the coarser phosphor particles. Thereby, the zinc sulfide based phosphor powder, which has the D(50) value in the range of from 10 to 20 μm, and the ratio of the coarser particle component, of which particle size is 31 μm or more, by 15% by mass or less, is obtained. According to the electroluminescent phosphor made of such zinc sulfide based phosphor powder, the particle density of the luminescent layer 2 may be sufficiently increased, without lowering the luminous efficiency of the phosphor powder. As a result, since the luminous efficiency and the particle density a volume of the luminescent element 1 may be increased, the brightness of the element may be largely increased.

The high brightness electroluminescent phosphor of the present invention is prepared according to, for instance, the following method.

That is, a predetermined amount of deionized water is added to zinc sulfide powder, of which particle size is in the range of substantially from 1 to 3 μm, to prepare a slurry, therein a predetermined amount of activator raw material, such as copper sulfate or manganese carbonate, is added, and followed by mixing. After drying such slurry, a grain growth agent (flux), such as magnesium chloride, barium chloride, sodium chloride, or the like, is added, and further followed by thorough mixing. In case a chloride is used as the grain growth agent (flux), an electroluminescent phosphor, which contains a slight amount of chlorine, is obtained. In case bromine or iodine is to be contained, bromide or iodide may be added as the grain growth agent (flux).

Then, the aforementioned mixture is filled in a quartz crucible, followed by firing in air at a temperature of from 1100 to 1200° C., for from 3 to 8 hr. The fired body, according to necessity, is washed, followed by adding several percent of zinc oxide, thereafter further followed by filling in a quartz crucible and firing in air under the conditions of (600 to 800° C.)×(1 to 2 hr). The fired body is dispersed in deionized water and washed several times. Furthermore, according to necessity, neutralizing is done with hydrochloric acid or the like and washing with deionized water, followed by filtering and drying, thereby a zinc sulfide based electroluminescent phosphor is prepared.

Such zinc sulfide based phosphor powder undergoes the classification to remove the coarser particle component. Various kinds of classification methods can be applied. Due to such classification, zinc sulfide based phosphor powder, which has an average particle size (the D(50) value) in the range of from 10 to 20 μm, and a particle size distribution, which contains the coarser particle component, which has the particle size of 31 μm or more, by 15% by mass or less, may be obtained. At this time, it is preferable for the zinc sulfide based phosphor powder to have a particle size distribution that contains the coarser particle component, which has the particle size of 31 μm or more, by 15% by mass or less, and the smaller particle component, which has the particle size of 5.5 μm or less, by 8% by mass or less.

The classification of the phosphor powder is carried out by means of, for instance, wet classification, cyclone classification, sieving, and so on. For instance, the phosphor powder obtained after firing and washing, and drying, is sieved by means of a #325-mesh sieve, and the #325-mesh sieved one is further sieved by means of a #635-mesh sieve. By thus sieving with the #635-mesh sieve, the electroluminescent phosphor that is excellent in luminous efficiency and capable of improving the particle density of the luminescent layer 2, that is, the zinc sulfide based phosphor powder that has the average particle size (the D(50) value) in the range of from 10 to 20 μm, and the particle size distribution in which the coarser particle component, of which particle size is 31 μm or more, is 15% by mass or less, may be obtained.

In the electroluminescent element 1 shown in FIG. 1 and the EL panel therewith, the number of particles a volume of the electroluminescent phosphor, that is, blue to blue green emitting zinc sulfide based phosphor or orange emitting zinc sulfide based phosphor, in the luminescent layer 2 is allowed to increase on the basis of the average particle size and the particle size distribution of the aforementioned zinc sulfide based phosphor powder. Accordingly, the brightness of the electroluminescent element 1 with such luminescent layer 2 may be largely increased.

In preparing the electroluminescent element and the EL panel therewith, instead of applying an anti-moisture film, such as the PCTFE film, anti-moisture treatment may be applied on a surface of the individual phosphor particles. The present invention may be applied also to the electroluminescent phosphor to which anti-moisture treatment, due to metal oxide or metal nitride, or resin, is applied. That is, the electroluminescent phosphor may have a protective film (an anti-moisture film) made of at least one kind selected from alumina, silica, titania, and so on. Even in such configuration, by controlling the average particle size and particle size distribution of the zinc sulfide based phosphor powder, the higher brightness of the electroluminescent element may be obtained.

Figure 2:
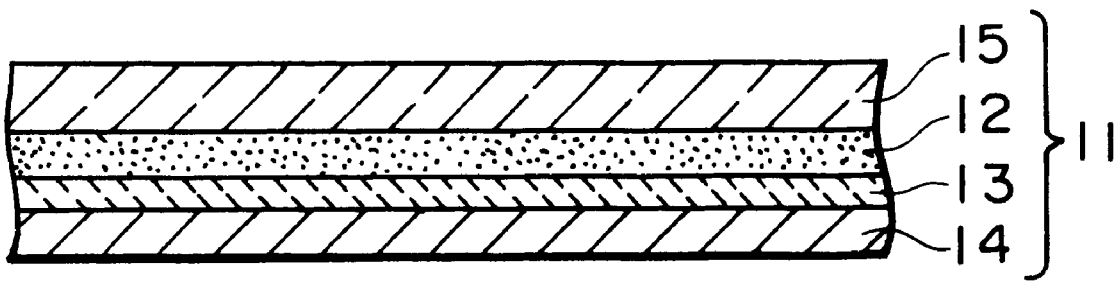
FIG. 2 is a sectional view schematically showing a substantial configuration of an electroluminescent element according to a second mode for implementation of the present invention.

FIG. 2 is a sectional view schematically showing a substantial configuration of an electroluminescent element according to a second mode of implementation of the present invention. FIG. 2 shows an electroluminescent element 11 that uses the electroluminescent phosphor, in which the aforementioned protective film is formed on the surface of the phosphor particle. The electroluminescent element 11, shown in FIG. 2, has the luminescent layer 12, which contains the zinc sulfide based phosphor powder, of which individual particles are coated by the protective film. The zinc sulfide based phosphor powder used here, with exception of the individual particles being covered by the protective film, has the average particle size and the particle size distribution identical as those of the first mode of implementation. Since the phosphor particles that are covered by the protective film are moisture resistant, emission characteristics of the electroluminescent phosphor may be suppressed from deteriorating due to moisture, without using the moisture absorbing film or the anti-moisture film.

Similarly as the electroluminescent element 1, shown in FIG. 1, a rear electrode layer 14 is integrally laminated through a reflective insulating layer 13 on one main surface of the luminescent layer 12. A transparent electrode layer (a transparent electrode sheet) 15 is integrally laminated on the other main surface of the luminescent layer 12. The rear electrode layer 14 may be formed by, for instance, screen-printing a slurry that is made by mixing metal powder or carbon powder together with a binder. Further on a back surface side of the rear electrode layer 14, as needs arise, a rear surface insulating layer (not shown) is laminated so as to secure insulation of the rear surface side of the luminescent element.

In the following, specific embodiments and evaluations of the present invention will be explained.

COMPARATIVE EXAMPLE 1

First, one liter of deionized water is added to 100 g of zinc sulfide powder, of which particle size is in the range of substantially from 1 to 3 μm, to cause a slurry state, therein 0.25 g of copper sulfate (pentahydrate), and 40 g of magnesium chloride, 40 g of barium chloride, and 20 g of sodium chloride, as the grain growth agent (flux), are added, followed by thorough mixing.

Next, the aforementioned slurry-like mixture is dried, followed by filling in a quartz crucible and firing in air at a temperature of 1150° C. for 4 hrs. The fired body, after washing and drying, is mixed with 15 g of zinc oxide with respect to the fired body of 300 g, followed by filling the mixture in a quartz crucible and firing in air at a temperature of 750° C. for 1.5 hrs. The fired body is dispersed three times in deionized water to wash. Furthermore, neutralizing is done with hydrochloric acid under the condition of pH=1.5 and washing with deionized water, followed by filtering and drying, further followed by sieving by means of a #325-mesh sieve, thereby an electroluminescent phosphor (ZnS: Cu) is obtained. This phosphor contains a slight amount of chlorine, which is used as the flux.

Figure 3:
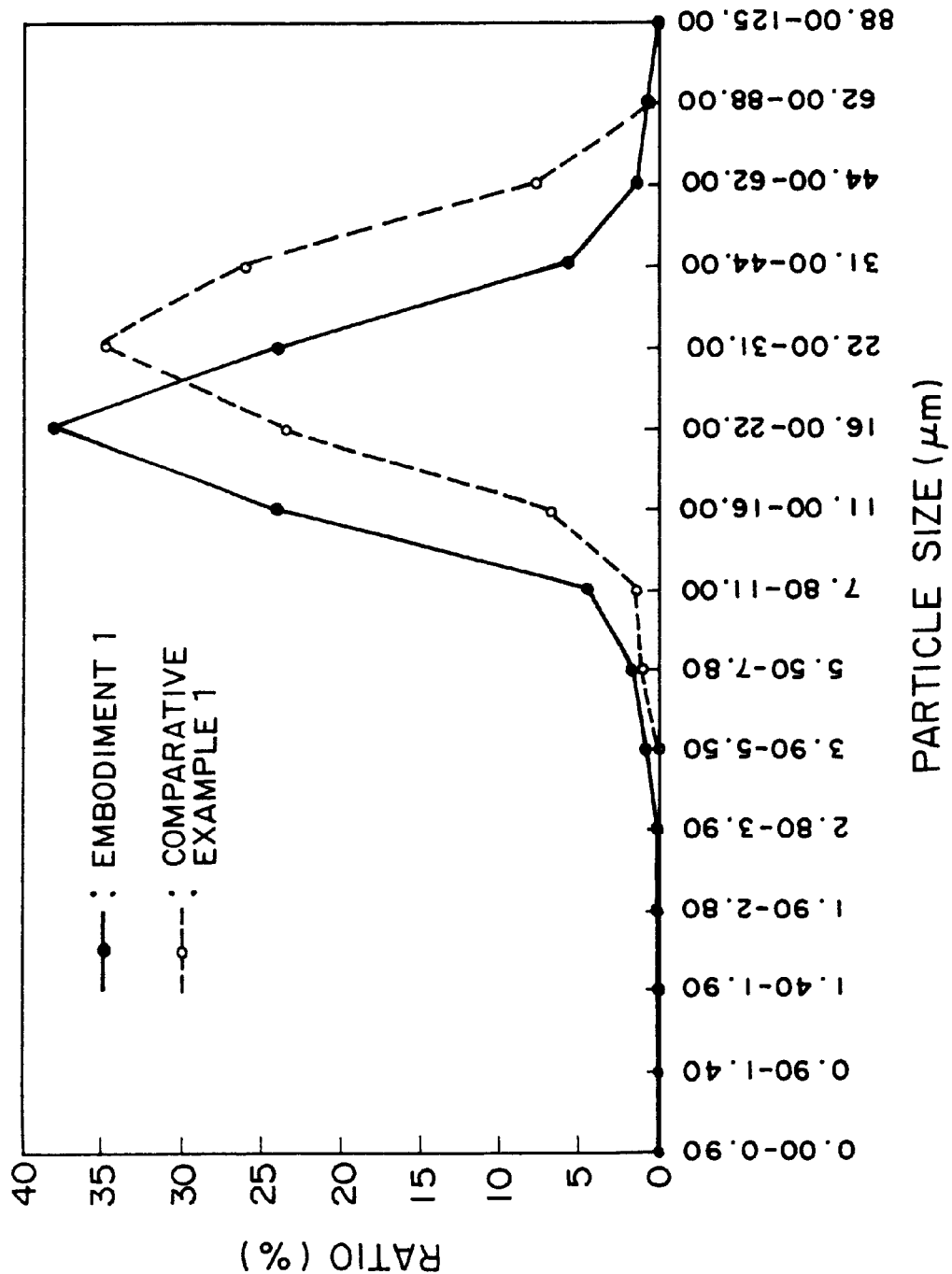
FIG. 3 is a diagram showing a particle size distribution of an electroluminescent phosphor (ZnS :Cu) according to Embodiment 1 of the present invention, in comparison with that of an electroluminescent phosphor according to Comparative Example 1.

The particle size distribution of the aforementioned ZnS: Cu phosphor is measured by means of Micro-track II Particle Size Analyzer (manufactured by LEEDS and NORTHRUP Instruments). Results thereof are shown in Table 1 and FIG. 3. When the D(50) value is obtained from this particle size distribution as the average particle size, the D(50) value is 26.7 μm. Furthermore, the ratio of the coarser particle component, of which particle size is 31 μm or more, is 24.3% by mass. The ZnS: Cu phosphor like this is supplied for evaluation of the characteristics described below.

Embodiment 1

Similarly as the aforementioned Comparative Example 1, first an electroluminescent phosphor (ZnS: Cu), of which D(50) value is 26.7 μm, is prepared. The phosphor powder is further sieved with the #635-mesh sieve, thereby an intended electroluminescent phosphor (ZnS: Cu) is obtained. The particle size distribution of the ZnS: Cu phosphor is measured similarly as the Comparative Example 1. The results are shown in Table 1 and FIG. 3. The D(50) value, which is obtained from the particle size distribution as the average particle size, is 19.3 μm. Furthermore, the ratio of the coarser particle component, of which particle size is 31 μm or more, is 8.1% by mass. The ZnS: Cu phosphor like this is supplied for evaluation of the characteristics described below.

TABLE 1

| Range of Particle Size (μm) | Ratio of Particles (%) | |
|---|---|---|
| | Comparative Example 1 | Embodiment 1 |
| 0.00–0.90 | 0 | 0 |
| 0.90–1.40 | 0 | 0 |
| 1.40–1.90 | 0 | 0 |
| 1.90–2.80 | 0 | 0 |
| 2.80–3.90 | 0 | 0 |
| 3.90–5.50 | 0.1 | 0.7 |
| 5.50–7.80 | 1.0 | 1.6 |
| 7.80–11.00 | 1.2 | 4.6 |
| 11.00–16.00 | 6.7 | 24.1 |
| 16.00–22.00 | 23.3 | 38.0 |
| 22.00–31.00 | 34.8 | 23.9 |
| 31.00–44.00 | 25.1 | 5.4 |
| 44.00–62.00 | 7.3 | 1.3 |
| 62.00–88.00 | 0.5 | 0.4 |
| 88.00–125.00 | 0 | 0 |
| D (50) Value (μm) | 26.7 | 19.3 |

Embodiment 2

Similarly as the aforementioned Comparative Example 1, first an electroluminescent phosphor (ZnS: Cu), of which D(50) value is 24.2 μm, is prepared. The phosphor powder is further sieved with the #635-mesh sieve, thereby an intended electroluminescent phosphor (ZnS: Cu) is obtained. The particle size distribution of this ZnS: Cu phosphor is measured similarly as the Comparative Example 1. The D(50) value, which is obtained from the particle size distribution as the average particle size, is 18.5 μm. Furthermore, the ratio of the coarser particle component, of which particle size is 31 μm or more, is 5.3% by mass. The ZnS: Cu phosphor like this is supplied for evaluation of the characteristics described below.

Embodiment 3

Similarly as the aforementioned Comparative Example 1, first, an electroluminescent phosphor (ZnS: Cu), of which D(50) value is 23.1 μm, is prepared. The phosphor powder is further sieved with the #635-mesh sieve, thereby an intended electroluminescent phosphor (ZnS: Cu) is obtained. The particle size distribution of this ZnS: Cu phosphor is measured similarly as the Comparative Example 1. The D(50) value, which is obtained from the particle size distribution as the average particle size, is 17.6 μm. Furthermore, the ratio of the coarser particle component, of which particle size is 31 μm or more, is 4.2% by mass. The ZnS: Cu phosphor like this is supplied for evaluation of the characteristics described below.

Embodiment 4

Similarly as the aforementioned Comparative Example 1, first, an electroluminescent phosphor (ZnS: Cu), of which D(50) value is 22.3 μm, is prepared. The phosphor powder is further sieved with the #635-mesh sieve, thereby an intended electroluminescent phosphor (ZnS: Cu) is obtained. The particle size distribution of this ZnS: Cu phosphor is measured similarly as the Comparative Example 1. The D(50) value, which is obtained from the particle size distribution as the average particle size, is 14.5 μm. Furthermore, the ratio of the coarser particle component, of which particle size is 31 μm or more, is 3.3% by mass. The ZnS: Cu phosphor like this is supplied for evaluation of the characteristics described below.

Embodiment 5

Similarly as the aforementioned Comparative Example 1, first, an electroluminescent phosphor (ZnS: Cu), of which D(50) value is 21.5 μm, is prepared. The phosphor powder is further sieved with the #635-mesh sieve, thereby an intended electroluminescent phosphor (ZnS: Cu) is obtained. The particle size distribution of this ZnS: Cu phosphor is measured similarly as the Comparative Example 1. The D(50) value, which is obtained from the particle size distribution as the average particle size, is 13.2 μm. Furthermore, the ratio of the coarser particle component, of which particle size is 31 μm or more, is 2.1% by mass. The ZnS: Cu phosphor like this is supplied for evaluation of the characteristics described below.

COMPARATIVE EXAMPLE 2

Under the same conditions as those disclosed in the Embodiment of the aforementioned U.S. Pat. No. 5,643,496 document, a small size electroluminescent phosphor (ZnS: Cu) is prepared. This small size electroluminescent phosphor is made small by controlling the firing conditions, without undergoing the sieving. The firing conditions for the first firing is 1160° C.×3.7 hr, that for the second firing is 730° C. The average particle size (D(50) value) of the small size electroluminescent phosphor is 13.2 μm, and, the ratio of the coarser particle component, of which particle size is 31 μm or more, is 22% by mass. The ZnS: Cu phosphor like this is supplied for evaluation of the characteristics described below.

COMPARATIVE EXAMPLE 3

By further lowering the firing temperature in the aforementioned Comparative Example 2, a small size electroluminescent phosphor (ZnS: Cu) is prepared. This small particle electroluminescent phosphor does not undergo the sieving. The average particle size (D(50) value) of the small particle electroluminescent phosphor is 18 μm, and, the ratio of the coarser particle component, of which particle size is 31 μm or more, is 18% by mass. The ZnS: Cu phosphor like this is supplied for evaluation of the characteristics described below.

With each of the zinc sulfide based phosphor powders according to the aforementioned Embodiments 1 through 5 and Comparative Examples 1 through 3, a cell for brightness evaluation is prepared. The cell is allowed to luminesce under the conditions of 200 V and 400 Hz, and the brightness is measured. The cell for brightness evaluation is configured as follows. A configuration of a cell for evaluation is a simple electroluminescent element called an oil cell. Measurements of the brightness due to the cell for brightness evaluation are shown in Table 2.

Furthermore, each of the aforementioned phosphor powders and an epoxy resin based binder are mixed with a volume ratio of 7 to 3, the mixture is coated on a transparent electrode sheet, thereby a luminescent layer (thickness: 40 μm) is formed. Furthermore, a reflective insulating layer and a rear electrode layer are formed. Thereby, an electroluminescent element is prepared for each of the phosphor powders. Each of the electroluminescent elements is operated under the conditions of 100 V and 400 Hz, and the brightness at that time is measured. Relative values of the brightness of these electroluminescent elements, normalized to the brightness of Comparative Example 1, are shown in Table 2.

In Table 2, the ratios of the small particle components, of which particle size, which is obtained from the particle size distribution of the ZnS: Cu phosphor powder, is 5.5 μm or less, are shown together. Furthermore, in FIG. 4, relationship between the average particle sizes (the D(50) value) of the ZnS: Cu phosphor powders, according to Embodiments 1 through 5 and Comparative Example 1, and the brightness of the electroluminescent elements (due to the cell for brightness evaluation) is shown.

TABLE 2

|  | Phosphor | Average Particle Size, D(50) Value (μm) | Ratio of Particles of which Particle Size is 31 μm or more (%) | Ratio of Particles of which Particle Size is 5.5 μm or less (%) | Element Brightness due to Cell for Evaluation (cd/m²) | Relative Brightness of EL Element (%) |
| --- | --- | --- | --- | --- | --- | --- |
| CE1 | ZnS:Cu | 26.7 | 24.3 | 0.0 | 65.3 | 100 |
| E1 | ZnS:Cu | 19.3 | 8.1 | 0.5 | 80.2 | 123 |
| E2 | ZnS:Cu | 18.5 | 5.3 | 2.3 | 85.1 | 130 |
| E3 | ZnS:Cu | 17.6 | 4.2 | 3.1 | 91.2 | 140 |
| E4 | ZnS:Cu | 14.5 | 3.3 | 4.2 | 95.0 | 146 |
| E5 | ZnS:Cu | 13.2 | 2.1 | 5.0 | 97.0 | 149 |
| CE2 | ZnS:Cu | 23 | 22 | 0 | 50–60 | 84 |
| CE3 | ZnS:Cu | 18 | 18 | 2 | 60–65 | 96 |

CE1 = Comparative Example 1;
CE2 = Comparative Example 2;
CE3 = Comparative Example 3;
E1 = Emobidment 1;
E2 = Embodiment 2;
E3 = Embodiment 3;
E4 = Embodiment 4;
E5 = Embodiment 5

Individual phosphors according to Embodiments 1 through 5 contain a slight amount of chlorine, respectively.

Figure 4:
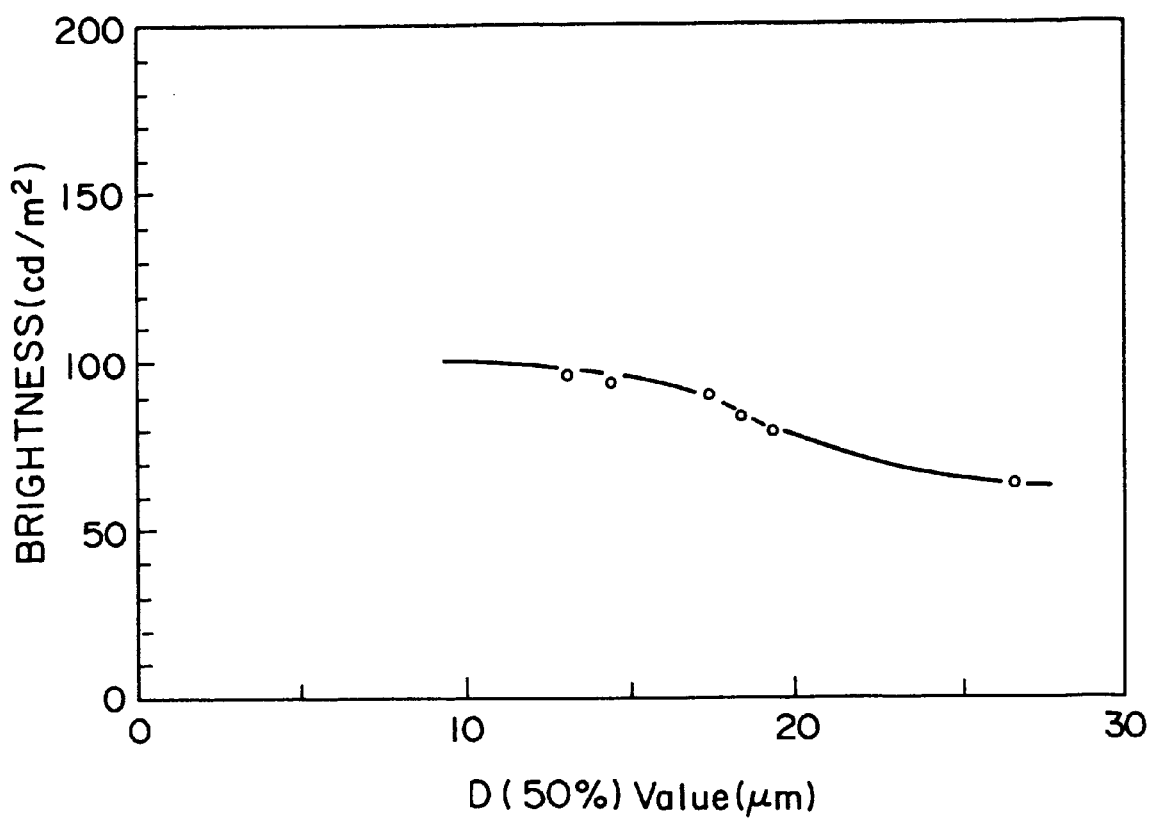
FIG. 4 is a diagram showing relationship between average particle size (D(50) value) of the electroluminescent phosphor (ZnS :Cu) and brightness of the electroluminescent element therewith.

As obvious from Table 2 and FIG. 4, according to Embodiments 1 through 5, in which the coarser particles in the zinc sulfide based electroluminescent phosphor are removed by means of sieving, thereby the average particle size (the D(50) value) is controlled in the range of from 10 to 20 μm and the ratio of the coarser particle component, of which particle size is 31 μm or more, is reduced to 15% by mass or less, the brightness of the electroluminescent elements is largely improved in comparison with that of Comparative Example 1 (the existing element). Furthermore, the electroluminescent elements according to Comparative Examples 2 and 3, in which small particles are obtained by controlling the firing conditions, are inferior in the element brightness to ones according to Embodiments 1 through 5.

COMPARATIVE EXAMPLE 4

In the aforementioned Comparative Example 1, with the exception that the grain growth agent (flux), which is added to the slurry containing zinc sulfide powder, is changed to bromide, similarly with Comparative Example 1, an electroluminescent phosphor (ZnS: Cu) is prepared. This ZnS: Cu phosphor is sieved with a #325-mesh sieve. This phosphor contains a slight amount of bromine, which is used as the flux.

The particle size distribution of the ZnS: Cu phosphor obtained thus is measured similarly as Comparative Example 1. The D(50) value obtained from the particle size distribution is 28.0 μm. In addition, the ratio of the coarser particle component, of which particle size is 31 μm or more, is 31.2% by mass. With this ZnS: Cu phosphor, similarly as Comparative Example 1, the cell for brightness evaluation and the electroluminescent element are prepared, and the brightness thereof is measured under the same conditions.

Embodiments 6–8

An electroluminescent phosphor (ZnS: Cu), which is prepared similarly as Comparative Example 4, is sieved with a #325-mesh sieve, thereby the phosphor powders, of which D(50) values are 24.1 μm, 24.1 μm, and 23.1 μm, respectively, are obtained. Then, the individual phosphor powders are sieved again with a #635-mesh sieve, thereby intended electroluminescent phosphors (ZnS: Cu) are obtained, respectively.

The particle size distributions of thus obtained individual ZnS: Cu phosphors are measured similarly as Comparative Example 1. The D(50) values, obtained from the individual particle size distributions, are 19.1 μm, 18.0 μm, and 13.1 μm, respectively. Furthermore, the ratios of the coarser particle component, of which particle size is 31 μm or more, are 7.3% by mass, 5.3% by mass, and 2.0% by mass, respectively. With each of the ZnS: Cu phosphors, the cell for brightness evaluation and electroluminescent element are prepared similarly as Comparative Example 4, and are measured of the brightness under the same conditions. In Table 3, particle size characteristics of the individual ZnS: Cu phosphors and their element brightness are shown together. The relative brightness, normalized to 100 of that of Comparative Example 4, of the electroluminescent elements is shown.

TABLE 3

|  | Phosphor | Average Particle Size, D(50) Value (μm) | Ratio of Particles of which Particle Size is 31 μm or more (%) | Ratio of Particles of which Particle Size is 5.5 μm or less (%) | Element Brightness due to Cell for Evaluation (cd/m²) | Relative Brightness of EL Element (%) |
| --- | --- | --- | --- | --- | --- | --- |
| CE4 | ZnS:Cu | 28.0 | 31.2 | 0.0 | 60.3 | 100 |
| E6 | ZnS:Cu | 19.1 | 7.3 | 0.5 | 75.6 | 125 |
| E7 | ZnS:Cu | 18.0 | 5.3 | 4.1 | 79.1 | 131 |
| E8 | ZnS:Cu | 13.1 | 2.0 | 5.0 | 87.6 | 145 |

CE4 = Comparative Example 4;
E6 = Emobidment 6;
E7 = Embodiment 7;
E8 = Embodiment 8
*Individual phosphors contain a slight amount of bromine.

COMPARATIVE EXAMPLE 5

In the aforementioned Comparative Example 1, with the exception that the grain growth agent (flux), which is added to the slurry containing zinc sulfide powder, is changed to iodide, similarly with Comparative Example 1, an electroluminescent phosphor (ZnS: Cu) is prepared. The ZnS: Cu phosphor is sieved with a #325-mesh sieve. This phosphor contains a slight amount of iodine, which is used as the flux.

The particle size distribution of the ZnS: Cu phosphor obtained thus is measured similarly as Comparative Example 1. The D(50) value, obtained from the particle size distribution, is 27.5 μm. In addition, the ratio of the coarser particle component, of which particle size is 31 μm or more, is 30.7% by mass. With this ZnS: Cu phosphor, similarly as Comparative Example 1, the cell for brightness evaluation and the electroluminescent element are prepared, and the brightness thereof are measured under the same conditions.

Embodiments 9–11

Each of electroluminescent phosphors (ZnS: Cu) prepared similarly as Comparative Example 5, after sieving with a #325-mesh sieve, is sieved again with a #635-mesh sieve, thereby intended electroluminescent phosphors (ZnS: Cu) are obtained, respectively.

The particle size distributions of thus obtained individual ZnS: Cu phosphors are measured similarly as Comparative Example 1. The D(50) values, obtained from the individual particle size distributions, are 19.5 μm, 16.3 μm, and 13.1 μm, respectively. Furthermore, the ratios of the coarser particle component, of which particle is 31 μm or more, are 7.8% by mass, 4.3% by mass, and 2.1% by mass, respectively. With each of the ZnS: Cu phosphors, the cell for brightness evaluation and electroluminescent element are prepared similarly as Comparative Example 5, and are measured of the brightness under the same conditions. In Table 4, particle size characteristics of the ZnS: Cu phosphors and their element brightness are shown together. The relative brightness of the electroluminescent elements is expressed normalized to 100 of that of Comparative Example 5.

TABLE 4

| Phosphor | | Average Particle Size, D(50) Value (μm) | Ratio of Particles of which Particle Size is 31 μm or more (%) | Ratio of Particles of which Particle Size is 5.5 μm or less (%) | Element Brightness due to Cell for Evaluation (cd/m$^2$) | Relative Brightness of EL Element (%) |
|---|---|---|---|---|---|---|
| CE5 | ZnS:Cu | 27.5 | 30.7 | 0.0 | 62.4 | 100 |
| E9  | ZnS:Cu | 19.5 | 7.8  | 0.5 | 77.0 | 123 |
| E10 | ZnS:Cu | 16.3 | 4.3  | 4.1 | 87.4 | 140 |
| E11 | ZnS:Cu | 13.1 | 2.1  | 5.0 | 91.9 | 147 |

CE5 = Comparative Example 5;
E9 = Emobidment 9;
E10 = Embodiment 10;
E11 = Embodiment 11
*Individual phosphors contain a slight amount of iodine.

COMPARATIVE EXAMPLE 6

In the aforementioned Comparative Example 1, with the exception of use of manganese carbonate together with copper sulfate as the activator source material, which is added to the slurry containing zinc sulfide powder, similarly as Comparative Example 1, an electroluminescent phosphor (ZnS: Cu, Mn) is prepared. The ZnS: Cu, Mn phosphor is sieved with a #325-mesh sieve.

The particle size distribution of the ZnS: Cu, Mn phosphor, obtained thus, is measured similarly as Comparative Example 1. The D(50) value, obtained from the particle size distribution, is 27.1 μm. In addition, the ratio of the coarser particle component, of which particle size is 31 μm or more, is 30.5% by mass. With this ZnS: Cu, Mn phosphor, similarly as Comparative Example 1, the cell for brightness evaluation and the electroluminescent element are prepared, and the brightness thereof are measured under the same conditions.

Embodiments 12–15

Each of electroluminescent phosphors (ZnS: Cu, Mn) prepared similarly as Comparative Example 6, after sieving with a #325-mesh sieve, is sieved again with a #635-mesh sieve, thereby intended electroluminescent phosphors (ZnS: Cu, Mn) are obtained, respectively.

The particle size distributions of thus obtained individual ZnS: Cu, Mn phosphors are measured similarly as Comparative Example 1. The D(50) values, obtained from the individual particle size distributions, are 19.7 μm, 17.3 μm, 14.2 μm, and 13.5 μm, respectively. Furthermore, the ratios of the coarser particle component, of which particle size is 31 μm or more, are 8.0% by mass, 5.1% by mass, 4.2% by mass, and 2.3% by mass, respectively. With each of the ZnS: Cu, Mn phosphors, the cell for brightness evaluation and electroluminescent element are prepared similarly as Comparative Example 6, and are measured of the brightness under the same conditions. In Table 5, particle size characteristics of the ZnS: Cu, Mn phosphors and their element brightness are shown together. The relative brightness of the electroluminescent elements is expressed normalized to 100 of that of Comparative Example 6.

TABLE 5

| | Phosphor | Average Particle Size, D(50) Value (μm) | Ratio of Particles of which Particle Size is 31 μm or more (%) | Ratio of Particles of which Particle Size is 5.5 μm or less (%) | Element Brightness due to Cell for Evaluation (cd/m$^2$) | Relative Brightness of EL Element (%) |
|---|---|---|---|---|---|---|
| CE6 | ZnS:Cu, Mn | 27.1 | 30.5 | 0.0 | 15.0 | 100 |
| E12 | ZnS:Cu, Mn | 19.7 | 8.0  | 0.5 | 24.6 | 121 |
| E13 | ZnS:Cu, Mn | 17.3 | 5.1  | 1.2 | 33.1 | 140 |
| E14 | ZnS:Cu, Mn | 14.2 | 4.2  | 3.2 | 34.3 | 143 |
| E15 | ZnS:Cu, Mn | 13.5 | 2.3  | 5.0 | 37.1 | 149 |

CE6 = Comparative Example 6;
E12 = Emobidment 12;
E13 = Embodiment 13;
E14 = Embodiment 14;
E15 = Embodiment 15

As obvious from the aforementioned Embodiments, according to the present invention, the high brightness electroluminescent phosphor, which has an average particle size and a particle size distribution, which are effective in improving the brightness of the electroluminescent element, may be provided, without lowering the brightness characteristics of the phosphor. As a result, according to the electroluminescent element, which uses such high brightness electroluminescent phosphor, the brightness demanded for the display device and so on may be satisfied.

It is to be understood that the invention is not restricted to the particular embodiments set forth herein as illustrated, but embraces all such modified forms thereof that come within the scope of the following claims.

What is claimed is:

1. An electroluminescent phosphor, comprising:

a phosphor powder of which a phosphor host is zinc sulfide, wherein the phosphor powder has an average particle size expressed by a D(50) value in the range of 10 μm or more and 20 μm or less, and a particle size distribution that a ratio of a component, of which particle size is 31 μm or more, is 15% by mass or less and exceeds zero.

2. An electroluminescent phosphor as set forth in claim 1:

wherein the ratio of the component, of which particle size is 31 μm or more, is in the range of 2.0% to 15% by mass.

3. An electroluminescent phosphor as set forth in claim 1:

wherein the phosphor powder has the particle size distribution obtained by removing coarser phosphor particles by means of classification.

4. An electroluminescent phosphor as set forth in claim 1:

wherein the phosphor powder comprises a component, of which particle size is 5.5 μm or less, in the range of 8% by mass or less.

5. An electroluminescent phosphor as set forth in claim 1:

wherein the electroluminescent phosphor comprises a composition in that at least one kind selected from copper and manganese as an activator is contained in the zinc sulfide as the phosphor host.

6. An electroluminescent phosphor as set forth in claim 5:

wherein the electroluminescent phosphor comprises at least one element selected from chlorine, bromine, and iodine, which are used as a flux.

7. An electroluminescent phosphor as set forth in claim 5:

wherein the electroluminescent phosphor comprises a blue to blue-green emitting ZnS: Cu phosphor.

8. An electroluminescent phosphor as set forth in claim 5:

wherein the electroluminescent phosphor comprises an orange emitting ZnS: Cu, Mn phosphor.

9. An electroluminescent phosphor as set forth in claim 4, wherein the phosphor powder comprises the component of which particle size is 5.5 μm or less in the range of 0.5% by mass or greater.

10. An electroluminescent phosphor as set forth in claim 9, wherein the phosphor powder comprises the component of which particle size is 5.5 microns or less in the range of 2.3% to 5.0% by mass.

11. An electroluminescent phosphor as set forth in claim 1, wherein the average particle size expressed by a D(50) value is 13.1 microns or more.

12. An electroluminescent phosphor as set forth in claim 1, wherein the phosphor powder comprises the component of which particle size is 31 μm or more in the range of 2.0% to 10% by mass.

13. An electroluminescent element, comprising:

a luminescent layer including the electroluminescent phosphor as set forth in claim 1.

14. An electroluminescent element as set forth in claim 13, further comprising:

a rear electrode layer, which is integrally disposed through a reflective insulating layer along one main surface of the luminescent layer; and a transparent electrode layer, which is integrally disposed so as to face the luminescent layer along the other surface thereof.

15. An electroluminescent element as set forth in claim 13, wherein the average particle size expressed by a D(50) value is 13.1 microns or more.

16. An electroluminescent element as set forth in claim 13, wherein the phosphor powder comprises ZnS:Cu and element brightness due to cell is 75.6 cd/m$^2$ to 97 cd/m$^2$.

17. An electroluminescent element as set forth in claim 13, wherein the phosphor powder comprises ZnS:Cu,Mn and element brightness due to cell is 24.6 cd/m$^2$ to 37.1 cd/m$^2$.

18. An electroluminescent element as set forth in claim 13, wherein the phosphor powder comprises the component of which particle size is 31 μm or more in the range of 2.0% to 15% by mass.

* * * * *

UNITED STATES PATENT AND TRADEMARK OFFICE
CERTIFICATE OF CORRECTION

PATENT NO.    : 6,702,958 B2
DATED         : March 9, 2004
INVENTOR(S)   : Toshifumi Takehara, Mitsuhiro Oikawa and Tsutomu Ishii It is certified that error appears in the above-identified patent and that said Letters Patent is hereby corrected as shown below:

Column 5,
Line 18, "µM" should read -- µm --.

Signed and Sealed this

Twenty-fifth Day of April, 2006

JON W. DUDAS
*Director of the United States Patent and Trademark Office*